Sept. 19, 1944.  W. F. WOLFNER, 2D  2,358,433
ELECTRONIC CONTROL APPARATUS
Filed Oct. 16, 1941

Inventor
William F. Wolfner II
by Roberts, Cushman & Woodbury.
att'ys.

Patented Sept. 19, 1944

2,358,433

UNITED STATES PATENT OFFICE 2,358,433

ELECTRONIC CONTROL APPARATUS

William F. Wolfner, II, Methuen, Mass., assignor to Photoswitch Incorporated, Cambridge, Mass., a corporation of Massachusetts Application October 16, 1941, Serial No. 415,258

6 Claims. (Cl. 250—27)

This invention relates to electronic control apparatus and more particularly to devices in which a comparatively small change of the electric condition of a controlling element effects considerable change, useful for industrial purposes, in the conductivity of a controlled circuit element.

The invention is especially applicable to industrial control circuits using gaseous conduction tubes, for example of the glow discharge type, although the control arrangement according to the invention is also applicable to circuits with high vacuum tubes.

It is one of the main objects of the invention to provide a control circuit of the above-mentioned type in which the tube control potential is derived from the energy supply, but can be varied independently of this potential supply arrangement through an impedance connected to the control electrode of the discharge device and coupled with the supply and controlling circuits.

The circuit according to the invention is especially suited when it is desirable to arrange a controlling device, as for example a probe circuit, electrically separated from the tube control circuit but energized from the same alternating current source; the circuit also permits complete electrical separation of supply, control and controlled circuits by insulating transformers.

These and other objects and aspects will be apparent from the following description of several practical embodiments illustrating the genus of the invention, this description referring to a drawing in which Figs. 1 to 4 are circuit diagrams of these embodiments.

Figure 1:
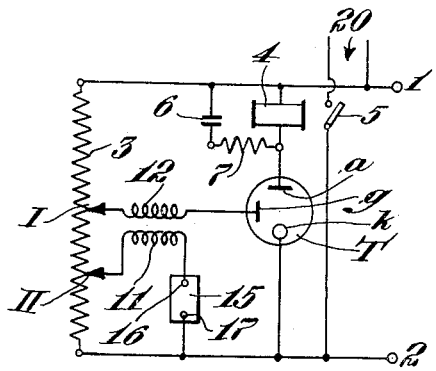

In the embodiment according to Fig. 1, an alternating current source indicated by terminals 1, 2 supplies a potential apportioning device, for example a potentiometer 3.

An electron discharge apparatus constituting a potential responsive control device, for example a gaseous conduction device, as a cold cathode or grid glow tube T with anode $a$, cathode $k$ and starting anode or auxiliary electrode $g$ is connected to the source in parallel with the potentiometer. A device responsive to the conductivity of tube T, for example relay magnet 4 actuating switch 5 and being equipped with condenser 6 and resister 7 to prevent chattering, is connected in the anode circuit of the tube.

Auxiliary electrode $g$ is connected to an intermediate point I of potentiometer 3 through a control circuit including impedance 12. A second impedance 11, inductively coupled with impedance 12, is connected in a controlling circuit between cathode $k$ and another tap II of the potentiometer, through controlling device 15 of varying impedance. For example, two detecting contacts or probes 16, 17 may be provided which if connected (as for example by a liquid whose level is to be supervised) bring the impedance of 15 from essentially infinite to a comparatively low finite value.

Tap I and impedances 11 and 12 are so selected that, with a certain impedance 15, the potential of electrode $g$ is either below or above the critical value at which it renders the tube conductive, whereas a change of the controlling impedance 15 effects a change of the potential difference across impedance 12 to such an extent that the potential of electrode $g$ rises above or falls below, respectively, that critical value.

It may be assumed, for example, that contacts 16 and 17 are to detect the maximum permissible head of a liquid level therebelow so that they are normally open, and it may be further assumed that switch 5 is to be normally open and to close, for example to ring a signal or to stop the supply of liquid if contacts 16, 17 are conductively connected. In that case, inductances 11 and 12 will be so wound, connected and coupled that, under these normal conditions, electrode $g$ carries a potential below the starting value and that the potential difference supplied through winding 11 upon closure of contacts 16, 17 boosts the potential of electrode $g$ to the starting value. Tube T then becomes conductive, magnet 4 is energized and switch 5 closed, energizing controlled circuit 20.

It will be understood that the values and the connection of the impedances involved depend entirely upon the conditions in question, but that it is very simple by means of appropriate taps or adjustable dividing points of potentiometer and coupled impedances to adapt this circuit to the most varied requirements.

Figure 2:
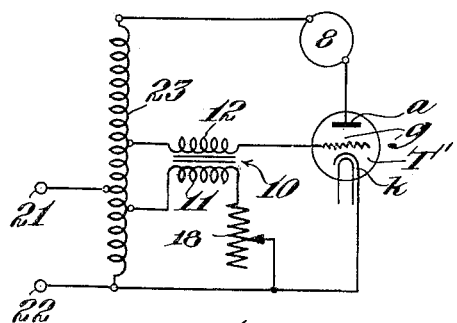

In the embodiment according to Fig. 2, the source 21, 22 feeds into the low voltage section of an autotransformer 23 which, in this instance, has the double purpose of providing a comparatively high voltage for tube T, and of providing proper potentials for the primary and the secondary of transformer 10 constituting the coupled impedances 11 and 12 of Fig. 1.

As indicated at 18, the controlling impedance may be gradually variable, so that the potential applied to the grid $g$ of a high vacuum tube T' changes accordingly affecting the conductivity of the tube, to which controlled apparatus 8, for example a meter, is responsive.

Figures 3, 4:
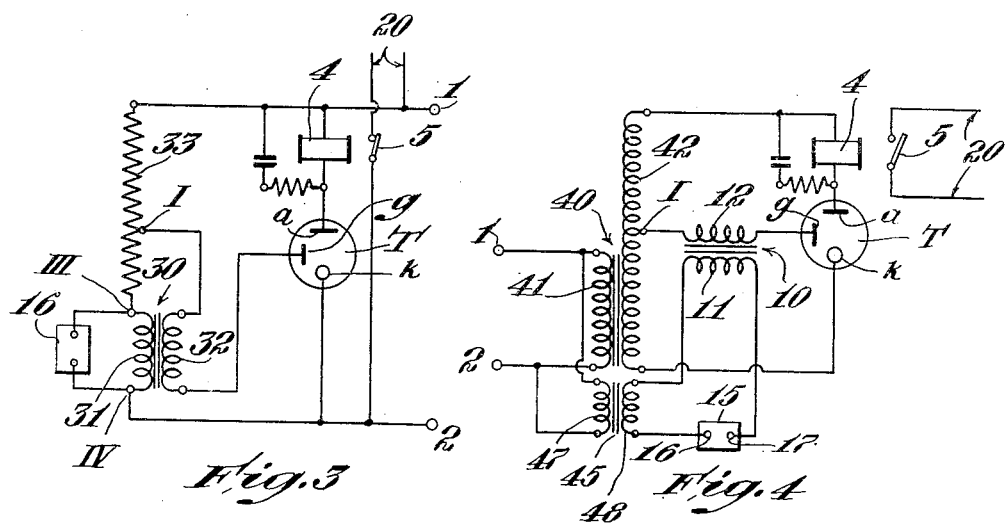

The embodiment according to Fig. 3 incorporates an impedance 31 in series with potentiometer 33 and coupled to impedance 32 connected between tap I and electrode $g$. The controlling or probe circuit 16 is connected in parallel to impedance device 30.

The potential difference between points III and IV and hence the potential difference across impedance 32 and the potential level of electrode $g$ will vary with the value of impedance 16 and the conductivity of the tube can, therefore, be controlled by means of controlling circuit element 16.

The embodiment according to Fig. 4 employs a main transformer 40 with primary 41 and secondary 42 supplying tube T with high voltage and having a tap I to which the electrode g is connected in series with the secondary 12 of control transformer 10. The primary 11 is connected to the secondary 48 of insulating transformer 45 whose primary 47 is supplied from source terminals 1, 2. Control impedance 16 is connected between secondary 48 and primary 11.

The operation of this circuit is quite similar to that of the circuits according to Figs. 1 to 3, but this arrangement has the advantage that the anode circuit of the tube is not affected by variations of the detecting impedance. Fig. 4 also indicates that circuits according to the invention can be so arranged that supply, control and controlled circuits are electrically wholly separated, which is important in certain industrial installations.

It should be understood that the present disclosure is for the purpose of illustration only and that this invention includes all modifications and equivalents which fall within the scope of the appended claims.

I claim:

1. Electronic control apparatus comprising a source of alternating current, potential aportioning means connected to said source, an electron tube with control electrode whose anode circuit is supplied from said source, a control transformer, a control circuit supplying said electrode with potential derived from said apportioning means and including the secondary of said transformer, and a controlling circuit connected to said source and including the primary of said transformer and in series with said primary a probe for varying the current of the controlling circuit, the potential of said electrode and the conductivity of said tube varying with the potential applied through said control circuit and hence with the potential difference applied thereto by said transformer as affected by said probe.

2. Electronic control apparatus comprising a source of alternating current, a control impedance whose conductivity varies proportionate to a controlling input potential, a supply circuit for said control impedance including a transformer having a secondary and a primary fed from said source, a control circuit connected to said secondary and normally supplying said control impedance with a controlling potential derived from said secondary and including an inductance, and a controlling circuit adapted to derive current directly from said source and including a second inductance magnetically coupled with said first inductance and in series thereto means for controllably varying said current, said input potential of said control impedance and its conductivity response varying with the potential applied through said control circuit and hence with the coupled inductance values as varied by said current.

3. Electronic control apparatus comprising a source of alternating current, potential apportioning means connected to said source, an electron discharge device having a load circuit supplied from said source and a control electrode, a control transformer, a control circuit adapted to apply to said electrode a potential derived from a tap of said apportioning means and including between said tap and said electrode the secondary of said transformer, and a controlling circuit connected to said source and including the primary of said transformer and a detecting impedance adapted to vary the current in said controlling circuit, the potential of said electrode and the conductivity of said discharge device varying with the potential applied through said control circuit and hence with the voltage applied thereto by said transformer as affected by said detecting impedance in said controlling circuit.

4. Electronic control apparatus comprising a source of alternating current, potential apportioning means connected to said source, an electron discharge device having a load circuit supplied from said source and a control electrode, a control transformer, a control circuit adapted to apply to said electrode a potential derived from a tap of said apportioning means and including between said tap and said electrode the secondary of said transformer, and a controlling circuit connected to said source and including the primary of said transformer and across said primary a detecting impedance adapted to vary the current in said controlling circuit, the potential of said electrode and the conductivity of said discharge device varying with the potential applied through said control circuit and hence with the voltage applied thereto by said transformer as affected by said detecting impedance in said controlling circuit.

5. Electronic control apparatus comprising a source of alternating current, a control transformer, potential apportioning means connected to said source in series with one winding of said transformer, an electron discharge device having a load circuit supplied from said source and a control electrode, a control circuit adapted to apply to said electrode a potential derived from a tap of said apportioning means and including between said tap and said electrode the other winding of said transformer, and a controlling circuit including a detecting impedance connected across said first transformer winding and adapted to vary the current in said controlling circuit, the potential of said electrode and the conductivity of said discharge device varying with the potential applied through said control circuit and hence with the voltage applied thereto by said transformer as affected by said detecting impedance in said controlling circuit.

6. Electronic control apparatus comprising a source of altenating current, an electron discharge device having a load circuit supplied from said source and a control electrode, a supply circuit for said discharge device including a transformer having a secondary connected to said load circuit and a primary fed from said source, a second transformer, a control circuit connected to said secondary and normally supplying to said control electrode a controlling input potential derived from said secondary and including a winding of said second transformer, and a controlling circuit connected for current supply to said source and including another winding of said second transformer and in series thereto a detecting impedance adapted to vary the current in said second transformer, said input potential and hence the conductivity of said discharge device varying with the potential applied through said control circuit and hence with the inductance of said second transformer as varied by said current.

WILLIAM F. WOLFNER, II.